US006108726A

United States Patent [19]
Runaldue et al.

[11] Patent Number: 6,108,726
[45] Date of Patent: Aug. 22, 2000

[54] REDUCING THE PIN COUNT WITHIN A SWITCHING ELEMENT THROUGH THE USE OF A MULTIPLEXER

[75] Inventors: Thomas Jefferson Runaldue, San Jose; Jayant Kadambi, Milpitas, both of Calif.

[73] Assignee: Advanced Micro Devices, Inc., Sunnyvale, Calif.

[21] Appl. No.: 08/713,489

[22] Filed: Sep. 13, 1996

[51] Int. Cl.[7] .................................. G06F 13/00; H04J 3/02
[52] U.S. Cl. .............................. 710/62; 710/131; 370/537
[58] Field of Search ...................................... 370/537, 540, 370/538, 535, 419, 516, 517, 539, 545; 375/372; 710/62, 131

[56] References Cited

U.S. PATENT DOCUMENTS

| | | | |
|---|---|---|---|
| H967 | 9/1991 | Mariotti | 370/112 |
| 3,660,606 | 5/1972 | De Witt | 370/229 |
| 3,665,405 | 5/1972 | Sanders et al. | 370/538 |
| 3,781,818 | 12/1973 | Pardoe et al. | 370/538 |
| 3,914,553 | 10/1975 | Melindo et al. | 370/535 |
| 4,143,246 | 3/1979 | Smith | 370/359 |
| 4,485,470 | 11/1984 | Reali | 370/537 |
| 4,805,165 | 2/1989 | Kawamura et al. | 370/535 |
| 4,951,280 | 8/1990 | McCool et al. | 370/258 |
| 5,442,628 | 8/1995 | Anderson et al. | 370/424 |
| 5,548,280 | 8/1996 | Pearce | 340/825.05 |
| 5,550,802 | 8/1996 | Worsley et al. | 370/252 |
| 5,553,095 | 9/1996 | Engdahl et al. | 375/222 |
| 5,619,652 | 4/1997 | Travaglio et al. | 395/200.8 |
| 5,754,540 | 5/1998 | Liu et al. | 370/315 |
| 5,754,764 | 5/1998 | Davis et al. | 1/1 |

FOREIGN PATENT DOCUMENTS 0424774  5/1991  European Pat. Off. .
WO9613922  5/1996  WIPO .

OTHER PUBLICATIONS

Journal of Telecommunication Networks, No. 2, 1984, pp. 89–101, XP0002041223, A.S. Acampora et al., "A Centralized Bus Architecture for Local Area Networks".

Primary Examiner—Ayaz R. Sheikh
Assistant Examiner—Sumati Lefkowitz
Attorney, Agent, or Firm—Sawyer & Associates

[57] ABSTRACT

The present invention comprises a system and method for reducing the pin count between a plurality of MAC and PHY devices within a switching element. In this embodiment, the switching element includes a plurality of general serial interfaces for providing connections between respective MAC and PHY devices and each of the plurality of general serial interfaces operates at a first data rate. The system and method comprises a multiplexer coupled to the plurality of general serial interfaces and a pad member including a plurality of pins. The pad member is coupled to the multiplexer and receives multiplexed signals from the plurality of general serial interfaces. The multiplexer operates at a second data rate that is a multiple of the first data rate. Generally, a system and method in accordance with the present invention allows for the multiplexing of a general purpose serial interface (GPSI) to reduce the pin count in some cases by as much as 75% and also synchronize the MAC/PHY interface. In this example, the multiplexer interface uses a total of 7 pins and supports a total of four MAC/PHY connections. If only GPSIs were utilized, 28 pins would be required for this function. The same multiplexing technique will also reduce the MAC/PHY interface in four 100 Mbps connections from 56 pins for a four port system to 18 pins. In each example the multiplexer interface will operate at four times the speed of the general serial interface.

10 Claims, 4 Drawing Sheets

REDUCING THE PIN COUNT WITHIN A SWITCHING ELEMENT THROUGH THE USE OF A MULTIPLEXER

TECHNICAL FIELD

The present invention relates generally to networks and more particularly to a system and method for reducing the pin count for interconnections within such a network.

BACKGROUND OF THE INVENTION

Ethernet switches are multi-port devices that are utilized in networks. The switches provide connections to several clients simultaneously. Each of the switches typically include Media Access Controller (MAC) devices that interface with Physical (PHY) devices. Typically, these devices require a specified number of pins to interface one MAC device with one PHY device. In addition, as the overall speed of the network increases generally the number of pins required for the interfaces also increases. Both of these factors generally increase the cost of the resultant switch. To illustrate these problems with an example, refer now to FIG. 1 in conjunction with the following discussion.

FIG. 1 is a block diagram of a six (6) port Ethernet switch 10. The switch 10 comprises a switch fabric 12, six IEEE 802.3 Media Access Control (MAC) devices 14 and six individual Physical (PHY) devices 16. Each PHY device as is seen is connected to a station 18. Each MAC device 14 connects to a corresponding PHY device 16 using several electrical connections. Typically, 10 Mbps MAC/PHY connections require 7 pins and 100 Mbps MAC/PHY connections require 18 pins.

Current generations of switch devices generally provide separate silicon pieces for the MAC and the PHY. As silicon processes improve, both the MAC functions and the PHY functions become integrated, often resulting in a single piece of silicon containing multiple (e.g., 4) MACs and multiple PHYs (e.g., 4).

As shown in FIG. 1, when multiple MAC devices 14 need to be connected to multiple PHY devices 16, a separate serial interface 20 is required for every MAC/PHY connection. Therefore, as the total number of device pairs increases or as the integration of PHY devices and MAC devices increases, the total pin count grows linearly. For example, a 10 Mbps quad physical layer device connected to a quad 10 Mbps MAC device will require a total of 28 pins and octal devices will require 56 pins. For 100 Mbps connections, the problem increases dramatically, a quad 100 Mbps MAC/PHY interconnect will require a total of 72 pins and octal devices will require 144 pins. Increasing the pin count generally increases the package size, resulting in an increase in silicon and system cost. Therefore, it is beneficial to provide a method and system to reduce the number of total pins required for highly integrated MAC/PHY devices.

Accordingly, what is needed is a method and system that allows for a reduced pin count for the MAC/PHY connections in conventional networks as well as when network speeds increase. The system and method should be cost effective, easily implemented and compatible with existing network architectures. The present invention addresses such a need.

SUMMARY

The present invention comprises a system and method for reducing the pin count between a plurality of MAC and PHY devices within a switching element. In this embodiment, the switching element includes a plurality of general serial interfaces for providing connections between respective MAC and PHY devices and each of the plurality of general serial interfaces operates at a first data rate. The system and method comprises a multiplexer coupled to the plurality of general serial interfaces and a pad member including a plurality of pins. The pad member is coupled to the multiplexer and receives multiplexed signals from the plurality of general serial interfaces. The multiplexer operates at a second data rate that is a multiple of the first data rate.

Generally, a system and method in accordance with the present invention allows for the multiplexing of a general purpose serial interface (GPSI) to reduce the pin count in some cases by as much as 75% and also synchronize the MAC/PHY interface. In this example, the multiplexer interface uses a total of 7 pins and supports a total of four MAC/PHY connections. If only GPSIs were utilized, 28 pins would be required for this function. The same multiplexing technique will also reduce the MAC/PHY interface in four 100Mbps connections from 56 pins for a four port system to 18 pins. In each example, the multiplexer interface will operate at four times the speed of the general serial interface.

DETAILED DESCRIPTION

The present invention relates to an improvement in the MACPHY interface in a network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
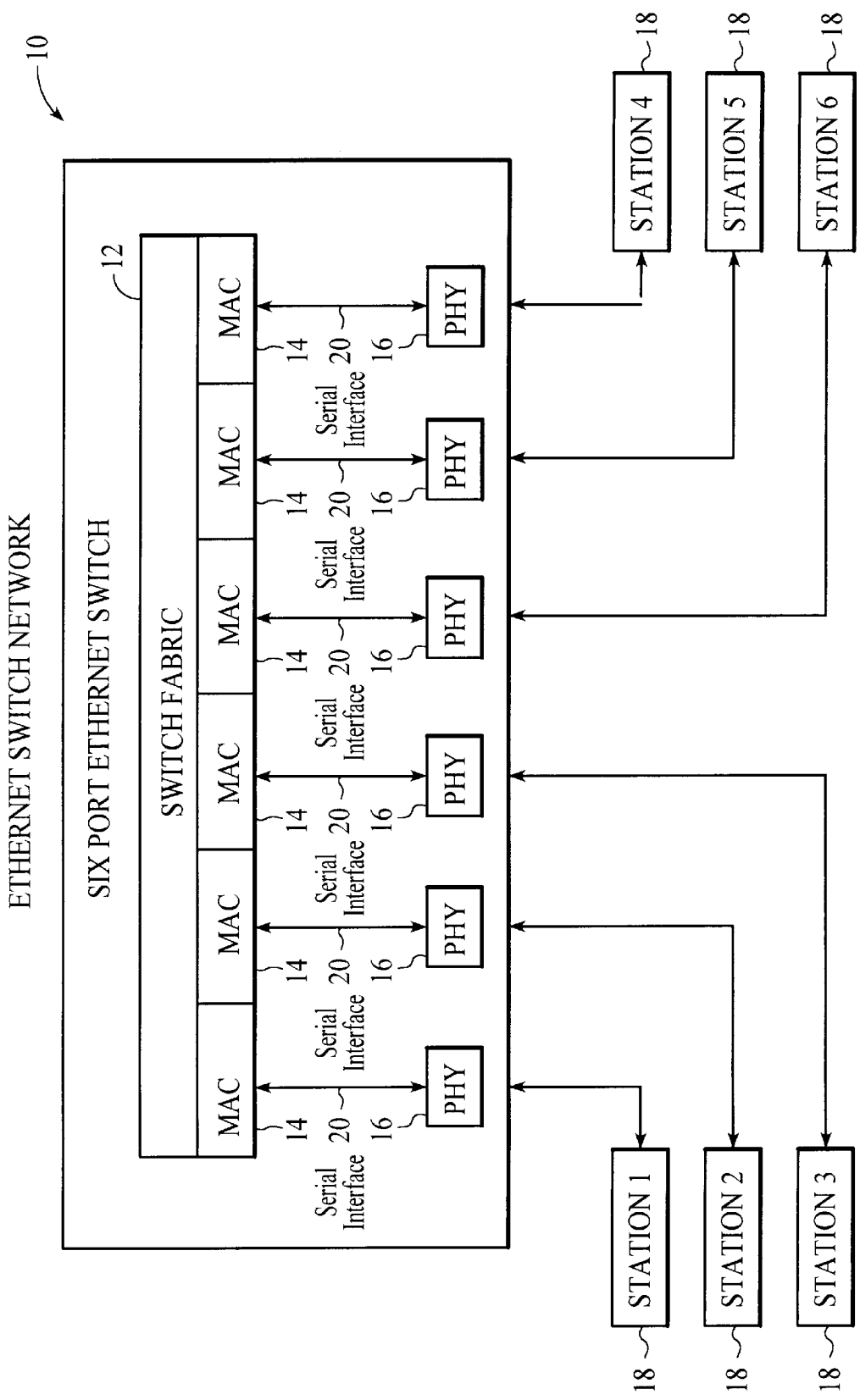
FIG. 1 is a block diagram of a six (6) port Ethernet switch.
Figure 2:
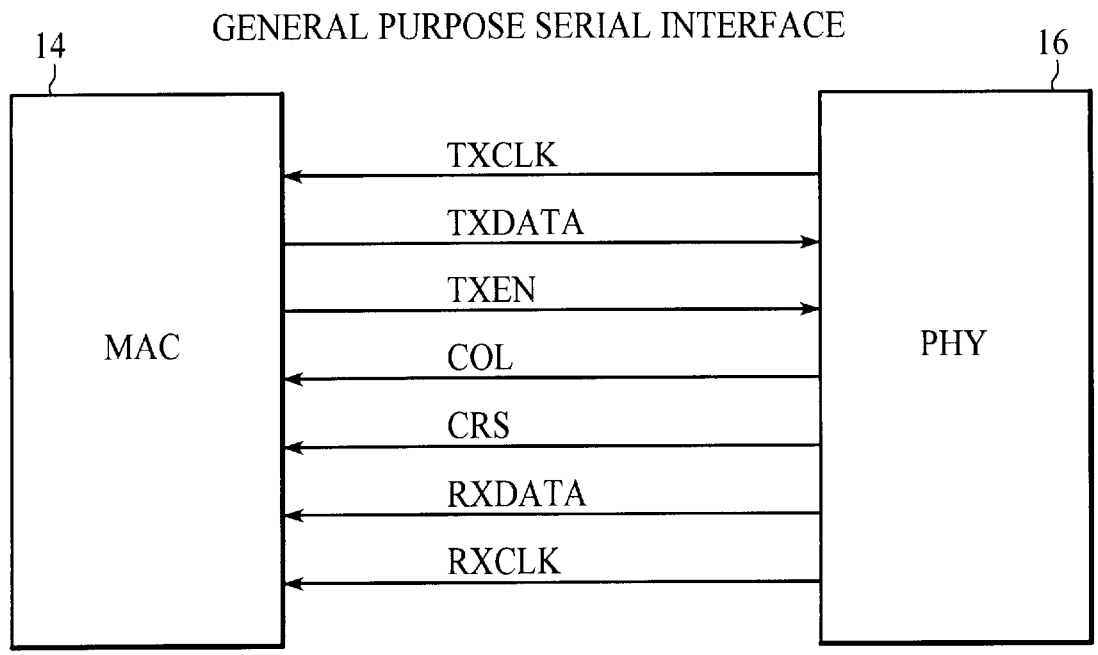
FIG. 2 is a block diagram of prior art General Purpose Serial Interface (GPSI) which is utilized for MAC/PHY interconnections.

FIG. 2 is a block diagram of prior art General Purpose Serial Interface (GPSI) 100 which is utilized for MAC/PHY interconnections. Each of the connections between MAC devices and PHY devices uses a (in this embodiment 10 Mbps) General Purpose Serial Interface (GPSI). The GPSI interface 100 in a preferred embodiment uses a total of 7 pins (TXCLK, TXDATA, TXEN, RXCLK, RXDATA, CRS and COL). TXCLK, TXEN and TXDATA are used to transfer serial Non Return to Zero (NRZ) data from the MAC to the PHY. When TXEN enable is valid, serial data is transferred synchronously with TXCLK. TXCLK is being sourced from the PHY to the MAC and is constantly running. RXCLK and RXDATA transfer data from the PHY to the MAC. Each pin is explained in some detail below.

TXCLK: This is an input from the PHY to the MAC and is a clock signal (typically 10 Mbps) that is synchronized to the network rate. It is always active.

TXDATA: This is an output from the MAC to the PHY and consists of 100 Mbps NRZ data to be transmitted onto the network. It is synchronous with TXCLK.

TXEN: This is an output from the MAC to the PHY and is a control signal that when valid indicates that the data on the TXDATA lines is valid data to be transmitted onto the network.

COL: This is an input from the PHY to the MAC that indicates that the PHY has detected a collision on the medium. COL is a signal that is used by all Ethernet MACs as part of their IEEE 802.3 functions.

CRS: This is an input from the PHY to the MAC that indicates that the PHY has detected transmit or receive activity on the medium. CRS is a signal that is used by all Ethernet MACs as part of their IEEE 802.3 functions.

RXDATA: This is an input from the PHY to the MAC that provides NRZ data (typically 10 Mbps) received from the network. It is synchronous with RXCLK.

RXCLK: This is an input from the PHY to the MAC that provides a 10 Mbps reference clock that is used to latch incoming network data. RXCLK and TXCLK are asynchronous and RXCLK is only valid when RXDATA is valid. At times when there is no network data incoming, RXCLK is not running.

Although this interface operates adequately in some network environments as networks becomes faster the pin count increases. For example, in a 10 Mbps network, a total of 28 pins are required to provide these interconnections. As has been before mentioned, these additional pins can significantly increase the cost of each device and therefore significantly increase the overall cost of the network. In addition, as has also been previously mentioned, as higher speed networks such as 100 Mbps are introduced, the pin count problem increases dramatically.

Accordingly, in the present invention a multiplexer interface is utilized with a plurality of serial interfaces to reduce the overall pin count of the devices. The multiplexer accomplishes this by operating at a data rate that is a multiple of the data rate of the serial interfaces.

Figure 3:
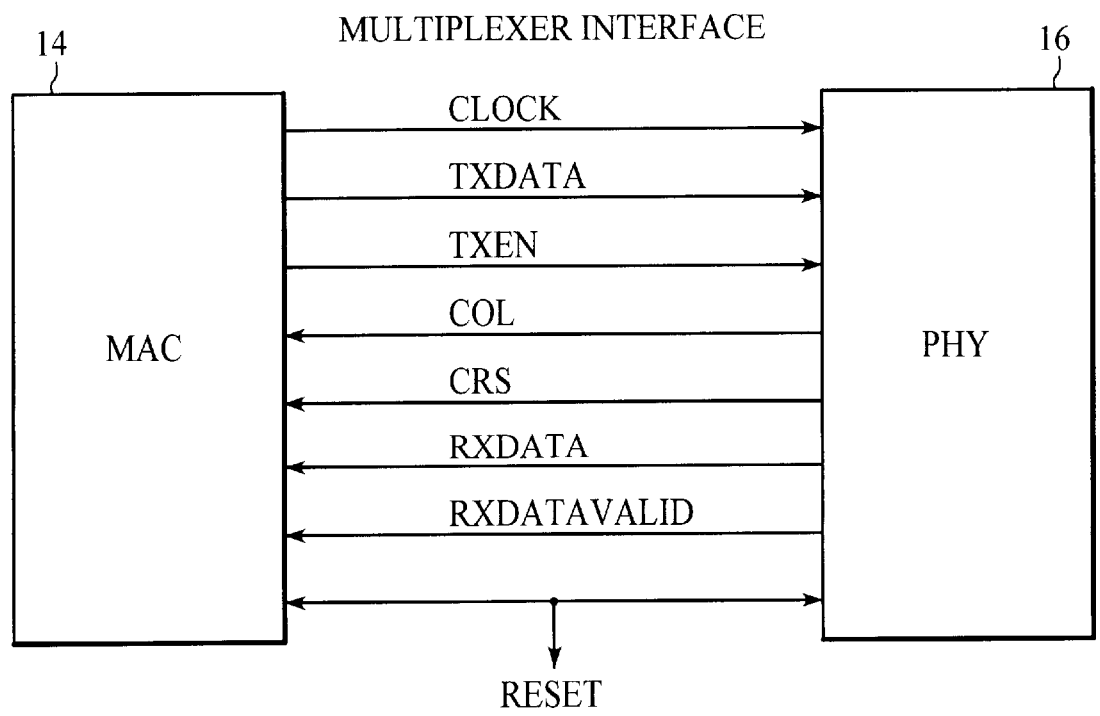
FIG. 3 illustrates the multiplexer interface signals in accordance with the present invention.

To more particularly describe the operation of a system and method in accordance with the present invention, refer now to following discussion in conjunction with the accompanying figures. Referring now to FIG. 3 what is shown are the multiplexer interface signals between a MAC 14 and PHY 16 in accordance with the present invention. The multiplexer interface of the preferred embodiment uses a total of 7 pins (CLOCK, TXDATA, TXEN, COL, CRS, RXDATA, and RXDATAVALID) for every four GPSI connections (normally 28 pins in the prior art). There is also a reset pin for allowing for the receipt and transmission of data.

The description of the pins is given below:

CLOCK: This is an input from the system. Both TXDATA and RXDATA are synchronous to CLOCK.

TXDATA: This is a multiplexed output from the MAC to the PHY and consists of 10 Mbps NRZ data to be transmitted onto the network.

TXEN: This is a multiplexed output from the MAC to the PHY and is a control signal that when valid indicates that the data on the TXDATA lines is valid data to be transmitted onto the network.

COL: This is a multiplexed input from the PHY to the MAC that indicates that the PHY has detected a collision on the medium.

CRS: This is a multiplexed input from the PHY to the MAC that indicates that the PHY has detected transmit or receive activity on the medium.

RXDATA: This is a multiplexed input from the PHY to the MAC that provides 10 Mbps NRZ data received from the network. It is synchronous with RXCLK.

RXDATAVALID: This is a multiplexed input from the PHY to the MAC that is a control signal indicating that data on the RXDATA lines is valid.

Figure 4:
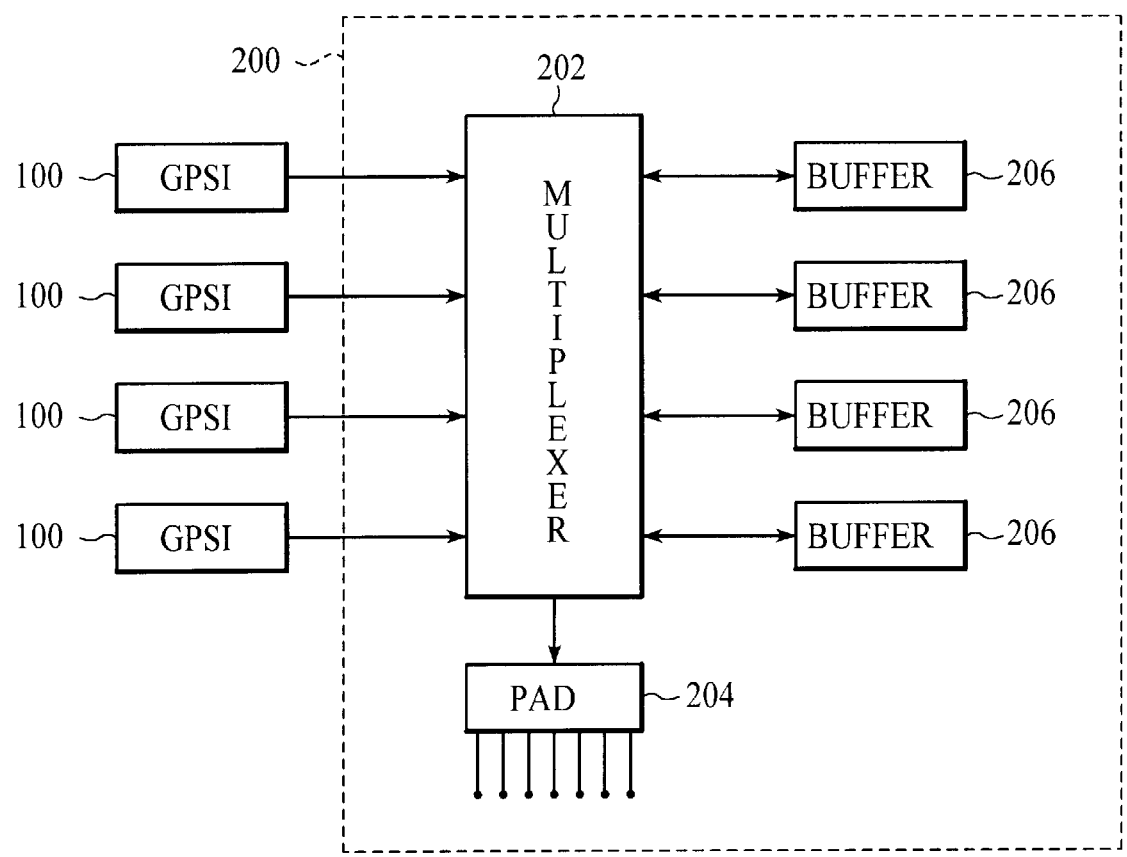
FIG. 4 is a block diagram of the multiplexer interface in accordance with the present invention.

Referring now to FIG. 4 what is shown is a block diagram of the multiplexer interface 200 in accordance with the present invention. The multiplexer interface 200 includes a multiplexer 202 which receives and multiplexes signals from a plurality of GPSIs 100. The multiplexer interface 200 also includes a pad member 204 which includes a predetermined number of pins for transferring the multiplexed signals. The multiplexer is controlled by a system clock which runs at a multiple of the data rate of the GPSIs.

The multiplexer interface 200 utilizes a plurality of elasticity buffers (an elasticity buffer 206 per network interface) coupled to the multiplexer 202 in order to rate match the frequency of the incoming received data to the rate of the synchronous CLOCK signal. Data is clocked into the elasticity FIFO 202 at the network rate and clocked out to the MAC at the CLOCK rate.

In a preferred embodiment, the multiplexer interface 200 time division multiplexes (TDM) multiple independent sets of signals (in this case 4 sets of 7) onto a single pad that includes a predetermined number of pins, in this case, seven pins. This is accomplished by operating the multiplexer interface at a multiple times the original data rate.

Also in a preferred embodiment, the multiplexer interface 200 runs at 40 MHz and all data transfers on RXDATA and TXDATA are synchronous with the single 40 MHz CLOCK signal. TXEN is used in the same manner as before. Since data on RXDATA is synchronous with a continuously running clock, there is an additional RXDATAVALID signal that is used to determine when data on the RXDATA bus is valid.

Figure 5:
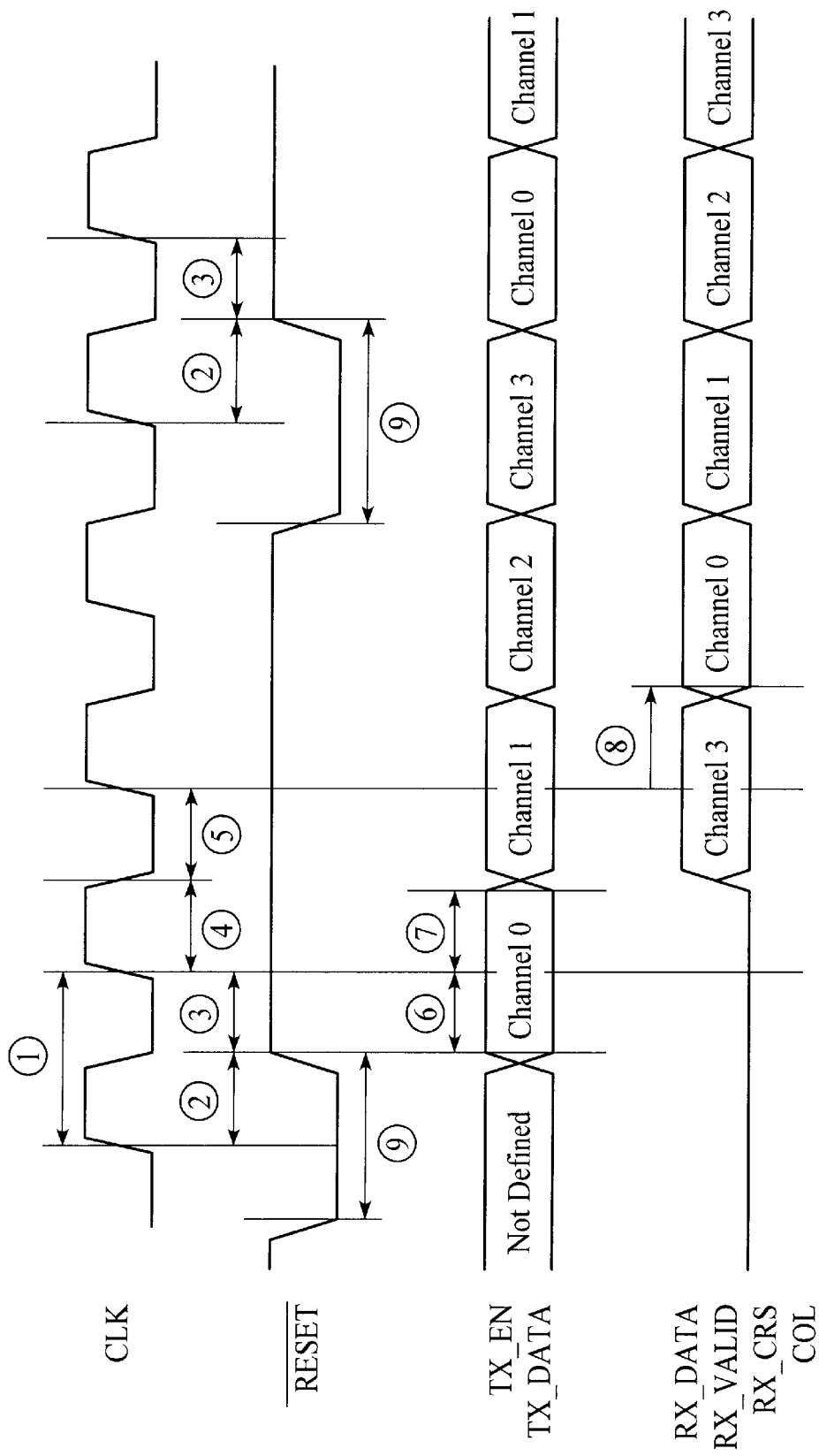
FIG. 5 shows the signal timing for multiplexed interface of FIGS. 3 and 4.

FIG. 5 shows the signal timing for multiplexed interface of FIGS. 3 and 4. In this embodiment, the multiplexer interface divides the 40 MHz clock into four separate clock phases or slots. Each phase of a 40 MHz clock accounts for a single slot for each of the four channels. Each of the four GPSI channels uses one of the four slots or phases to transmit and receive data and indicate COL and CRS. The transmit data for the first channel 0 are sent on the first phase of CLOCK, the transmit data for the second phase are sent on the second phase of CLOCK, etc., as shown. The phases of the clock signal are referenced to the reset signal being active.

On the phase of CLOCK in which transmit data for channel 2 is being sent, data, COL and CRS is received for channel 0. Successive clock edges increment the channel slot number in repetitive fashion. The channel order is from 0 to 1 to 2 to 3. All signal pins are synchronous to CLOCK.

Accordingly, a multiplexer interface in accordance with the present invention provides the advantages of:

Significantly reducing the pin count (in this case from 28 pins to 7 pins). In the general case, a number of sets of GPSI interfaces can be multiplexed onto a single interface by operating at a higher clock rate. For example, to multiplex 4 GPSI interfaces, requires a 40 MHz multiplexer interface, to multiplex 8 GPSI interfaces will require an 80 MHz interface.

It synchronizes the input data stream (network timing) with the system clock.

Although the system and method has been described in accordance with the embodiments shown, one of ordinary skill in the art will readily recognize that there could be variations to the embodiments and those variations would be within the spirit and scope of the above described system and method. For example, although the GPSI interfaces are described as the serial interfaces, other serial interfaces such as, for example, the IEEE 802.3 MII Media Independent Interface (MII) could be utilized and their use would be within the spirit and scope of the present invention. In another example, although the data rate of the multiplexer interface is four times the data rate of the serial interface as disclosed in the application the data rate can be any multiple of the data rate of the serial interface and that use would be within the spirit and scope of the present invention. Finally, it should be understood that although the disclosed multiplexer interface utilizes seven pins, the number of pins is not the critical feature; the critical feature being that number of pins in the multiplexer interface is a subset of the total pins of the general purpose serial interfaces. Accordingly, many modifications may be made by one of ordinary skill in the art without departing from the spirit and scope of the appended claims.

We claim:

1. A system for reducing a pin count between a plurality of media access controller (MAC) devices and a plurality of physical (PHY) devices within a switching element, the switching element including a plurality of serial interfaces for providing connections between respective MAC and PHY devices, each of the plurality of serial interfaces coupling a particular MAC device of the plurality of MAC devices with a particular PHY device of the plurality of PHY devices, each of the plurality of serial interface operating at a first data rate, the system comprising:

a multiplexer coupled to the plurality of serial interfaces; and a pad member including a plurality of pins; the pad member coupled to the multiplexer for receiving multiplexed signals from the plurality of serial interfaces; the multiplexer operating at a second data rate that is a multiple of the first data rate to allow the plurality of serial interfaces coupling the plurality of MAC devices to the plurality of PHY devices to utilize the plurality of pins.

2. The system of claim 1 in which the plurality of serial interfaces comprise a plurality of general purpose serial interfaces (GPSIs).

3. The system of claim 1 in which the multiplexer is controlled by a system clock.

4. The system of claim 3 in which each of the plurality of serial interfaces is controlled by a clock signal provided by the PHY device that is synchronized to the system clock.

5. The system of claim 4 in which the system includes a plurality of elasticity buffers coupled to the multiplexer for synchronizing the system.

6. A method for reducing a ping count between a plurality of media access controller (MAC) devices and a plurality of physical (PHY) devices within a switching element, the switching element including a plurality of serial interfaces for providing connections between respective MAC and PHY devices, each of the plurality of serial interfaces for coupling a particular MAC device of the plurality of MAC devices with a particular PHY device of the plurality of PHY devices each of the plurality of serial interfaces operating at a first data rate, the method comprising the steps of:

(a) providing a multiplexer coupled to the plurality of serial interfaces; and (b) providing a pad member including a plurality of pins; the pad member coupled to the multiplexer for receiving multiplexed signals from the plurality of serial interfaces; the multiplexer operating at a second data rate that is a multiple of the first data rate to allow the plurality of serial interfaces coupling the plurality of MAC devices to the plurality of PHY devices to utilize the plurality of pins.

7. The method of claim 6 in which the plurality of serial interfaces comprise a plurality of general purpose serial interfaces (GPSIs).

8. The method of claim 6 in which the multiplexer is controlled by a system clock.

9. The method of claim 8 in which each of the plurality of serial interface is controlled by a clock signal provided by the PHY device that is synchronized to the system clock.

10. The method of claim 9 in which the system includes a plurality of elasticity buffers coupled to the multiplexer for synchronizing the system.

* * * * *